(12) United States Patent  
Knorpp

(10) Patent No.: US 9,124,179 B2  
(45) Date of Patent: Sep. 1, 2015

(54) METHOD FOR CURRENT CONTROL IN A DIRECT VOLTAGE NETWORK OF A DIRECT VOLTAGE CONVERTER AND A DIRECT VOLTAGE CONVERTER

(71) Applicant: Robert Bosch GmbH, Stuttgart (DE)

(72) Inventor: Thomas Knorpp, Freiberg A. N. (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

(21) Appl. No.: 13/714,029

(22) Filed: Dec. 13, 2012

(65) Prior Publication Data

US 2013/0155725 A1    Jun. 20, 2013

(30) Foreign Application Priority Data

Dec. 14, 2011  (DE) .......................... 10 2011 088 630  
Feb. 8, 2012   (DE) .......................... 10 2012 201 829

(51) Int. Cl.

| | |
|---|---|
| *B60L 11/00* | (2006.01) |
| *H02M 3/22* | (2006.01) |
| *B60L 11/14* | (2006.01) |
| *H02J 1/04* | (2006.01) |
| *G05F 1/10* | (2006.01) |

(52) U.S. Cl.
CPC ................ *H02M 3/22* (2013.01); *B60L 11/14* (2013.01); *H02J 1/04* (2013.01); *B60L 2210/10* (2013.01); *B60L 2210/40* (2013.01); *B60L 2240/529* (2013.01); *G05F 1/10* (2013.01); *Y02T 10/70* (2013.01); *Y02T 10/7077* (2013.01); *Y02T 10/7216* (2013.01); *Y02T 10/7241* (2013.01)

(58) Field of Classification Search
CPC ............. H02M 3/22; H02J 1/04; B60L 11/14; B60L 2210/10; B60L 2210/40; B60L 2240/529; G05F 1/10  
USPC ................... 363/15; 323/239, 282–285, 267; 307/10.1  
See application file for complete search history.

(56) References Cited

U.S. PATENT DOCUMENTS

| | | | | |
|---|---|---|---|---|
| 8,044,534 | B2* | 10/2011 | Kojima et al. .................. 307/52 |
| 8,466,655 | B2* | 6/2013 | Mitsutani ....................... 320/109 |
| 8,581,553 | B2* | 11/2013 | Takaichi et al. ............... 320/132 |
| 2012/0173031 | A1* | 7/2012 | Parameswaran et al. ..... 700/295 |
| 2012/0205985 | A1* | 8/2012 | Inakagata ....................... 307/82 |

FOREIGN PATENT DOCUMENTS

| | | |
|---|---|---|
| DE | 102007038587 | 5/2009 |
| DE | 102009055331 | 6/2011 |
| WO | 2010065598 | 6/2010 |

* cited by examiner

*Primary Examiner* — Jessica Han  
(74) *Attorney, Agent, or Firm* — Michael Best & Friedrich LLP

(57) ABSTRACT

A method for the control of a first current in a first direct voltage network which is connected to a direct voltage converter, wherein energy is transmitted between the first and a second direct voltage network via a transformation unit of the direct voltage converter, wherein a current control is provided for the control of a second current in the second direct voltage network. A second current setpoint is determined from a first current setpoint of the first direct voltage network based on a transfer function of the transformation unit, which second current setpoint is fed to the current control and therefore, due to the transformation ratio of the transformation unit, a first actual current of the current-control-free direct voltage network is controlled.

6 Claims, 4 Drawing Sheets

METHOD FOR CURRENT CONTROL IN A DIRECT VOLTAGE NETWORK OF A DIRECT VOLTAGE CONVERTER AND A DIRECT VOLTAGE CONVERTER

BACKGROUND OF THE INVENTION

The invention relates to a method for current control in a direct voltage network of a direct voltage converter which transmits energy between two direct voltage networks with different direct voltage, and wherein the current control controls a current in one of the direct voltage networks, as well as a direct voltage converter.

A method for operating a DC voltage converter in a hybrid vehicle which has two on-board networks with different voltage is disclosed in DE 10 2007 038 587 A1. The first on-board network is the normal on-board network of the vehicle, which, for cars, usually provides 12 V and is used to supply the control devices and/or auxiliary equipment of the hybrid vehicle. The second on-board network, which is referred to as the high-voltage on-board network, carries a higher voltage level of 230 V, for example, to supply the voltage to the electric motor contained in the hybrid vehicle. The DC voltage converter, which is also referred to as a DC/DC converter, transmits electrical power between the two on-board networks. By means of such a DC voltage converter, energy can be transmitted bidirectionally between the energy storage units which are arranged both in the high-voltage direct voltage network and in the low-voltage direct voltage network.

Hybrid vehicles have been disclosed in which the current of the low-voltage voltage network can be controlled when the direct voltage converter transmits energy from the high-voltage direct voltage network into the low-voltage direct voltage network, which is referred to as so-called buck operation. If, for reasons of configuration of the hybrid drive of the hybrid vehicle, the current in the high-voltage direct voltage network is to be controlled, additional hardware must be created which increases the costs for manufacturing the hybrid drive.

SUMMARY OF THE INVENTION

The method according to certain embodiments of the invention for the current control of a first current in a first direct voltage network of a direct voltage converter has the advantage that the current control of the current-control-free first direct voltage network can be carried out without additionally installed hardware. In the process, a second current setpoint (i3_soll) of the second direct voltage network on which the current control acts is determined from a first current setpoint (i1_soll) of the control-free first direct voltage network. This second current setpoint is fed to the current control of the second direct voltage network on which the current control acts. A second actual current (i3) of the second direct voltage network on which the current control acts is therefore controlled to the level of the second current setpoint. By means of the transformer, which has a constant transformation ratio, the second actual current (i3) is converted to a first actual current (i1) in the current-control-free first direct voltage network. The first actual current of the current-control-free first direct voltage network is therefore controlled to the level of the first current setpoint. A cost-effective solution with reduced complexity for the control of the first current in the current-control-free first direct voltage network is therefore realized. When transferring energy between the current-control-free first direct voltage network and the second direct voltage network which is equipped with the current control, it is therefore possible to control directly to the level of the first current which occurs in the current-control-free first direct voltage network without the need for additional electrical components.

In an embodiment, a second current setpoint limit (I_LV_Lim) of the second direct voltage network which is equipped with the current control is determined from a first current setpoint limit (I_HV_Lim) of the current-control-free first direct voltage network which is corrected by an offset current value. This measure compensates for variations in efficiency of the direct voltage converter.

In a variant, the offset current value is formed from a difference between the first current setpoint limit (I_HV_Lim) of the current-control-free first direct voltage network and the measured actual current (I_HV_Ist) of the current-control-free first direct voltage network, wherein this difference is fed, in particular, to a further control path.

In an improvement, the difference is limited in the further control with regard to the tolerances which are to be expected of the current control of the second direct voltage network on which the current control acts. The result of this is that the additional control only corrects the small tolerances of the current control for the current-control-free first direct voltage network which are to be expected. Increasing the dynamics of the direct voltage converter for rapid changes in the energy transfer ensures that implausible values of the offset current value are not used in the current control.

A further improvement of the invention relates to a direct voltage converter which is arranged between two direct voltage networks with different direct voltage and which has a transformation unit for connecting the two DC voltage networks, wherein a second of the DC voltage networks has a current control. A cost-effective and simply constructed direct voltage converter has means which determine a second current setpoint (i3_soll) of the second direct voltage network on which the current control acts from a first current setpoint (i1_soll) of a control-free first direct voltage network. This second current setpoint is fed to the current control of the second direct voltage network on which the current control acts. A second actual current (i3) of the second direct voltage network on which the current control acts is therefore controlled to the level of the second current setpoint (i3_soll). By means of the transformer, which has a constant transformation ratio, the second actual current (i3) is converted to a first actual current (i1) of the current-control-free first direct voltage network. The first actual current of the current-control-free first direct voltage network is therefore controlled to the level of the first current setpoint. A cost-effective solution with reduced complexity for the control of the current in the current-control-free first direct voltage network is therefore realized. When transferring energy between the current-control-free first direct voltage network and the second direct voltage network which is equipped with the current control, it is therefore possible to control directly to the level of the first current which occurs in the current-control-free first direct voltage network. Advantageously, no additional hardware units for the current control of the current-control-free first direct voltage network are needed for this.

In a variant, the voltage transformation unit is in the form of a transformer.

BRIEF DESCRIPTION OF THE DRAWINGS

The invention allows numerous embodiments. One of these is explained in more detail with reference to the figures shown in the drawing.

In the drawing.

Similar features are identified with the same references.

DETAILED DESCRIPTION

Figure 1:
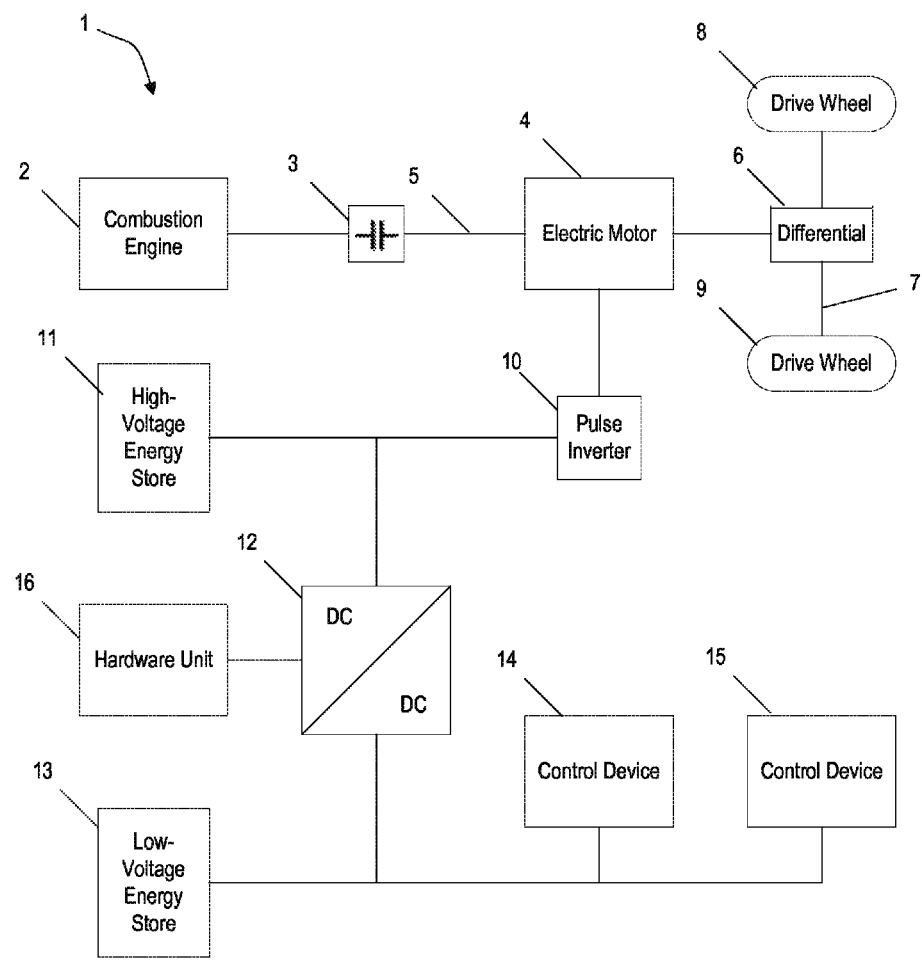
FIG. 1: shows a schematic diagram of a drive train of a hybrid vehicle.

The principle of a drive train 1 of a hybrid vehicle is shown in FIG. 1, wherein a combustion engine 2 is connected to an electric motor 4 by means of a disconnecting clutch 3. Here, the electric motor 4 is arranged particularly on the drive shaft 5 which is driven by the combustion engine 2 and leads to a differential 6 which is fixed to a drive axle 7 and drives the drive wheels 8 and 9 of the hybrid vehicle. Gears and clutches, which are not shown here, for matching the ratio and the speeds between the drive shaft 5 and the drive wheels 8 can be provided between the electric motor 4 and the differential 6.

In order to supply energy, the electric motor 4 is connected via a pulse inverter 10 to a high-voltage energy store 11 which provides energy for operating the electric motor 4. At the same time, the high-voltage energy store 11 has a voltage of 230 V for example. If the electric motor 4 is working as a generator, for example when the hybrid vehicle is traveling downhill, then, in this operating state, the mechanical energy which is generated by the hybrid vehicle rolling downhill is converted into electrical energy by the electric motor 4 and fed via the pulse inverter 10 to the high-voltage storage unit 11.

The pulse inverter 10, the high-voltage storage unit 11 and the connecting cables connected between them are components of a high-voltage direct voltage network of the hybrid vehicle. Further, a direct voltage converter 12 is connected to the high-voltage direct voltage network between the high-voltage energy store 11 and the pulse inverter 10. This is also referred to as a DC/DC converter. A connection is made between the high-voltage direct voltage network and a low-voltage direct voltage network of the hybrid vehicle by means of the direct voltage converter 12. An energy exchange, for example, between the high-voltage energy store 11 and a low-voltage energy store 13 is therefore possible. The low-voltage energy store 13 is usually a battery, which, for example, provides 12 V in passenger cars and 24 V in commercial vehicles. This low-voltage energy store 13 supplies auxiliary equipment of the motor vehicle and, in particular, its control devices 14, 15 with energy. The direct voltage converter 12 is controlled by a hardware unit 16 for setting the electrical parameters (voltage, current) of the direct voltage converter 12. The current control for the current control of the second current in the second direct voltage network of the direct voltage converter 12 can also be constructed of hardware in this hardware unit 16.

Figure 2:
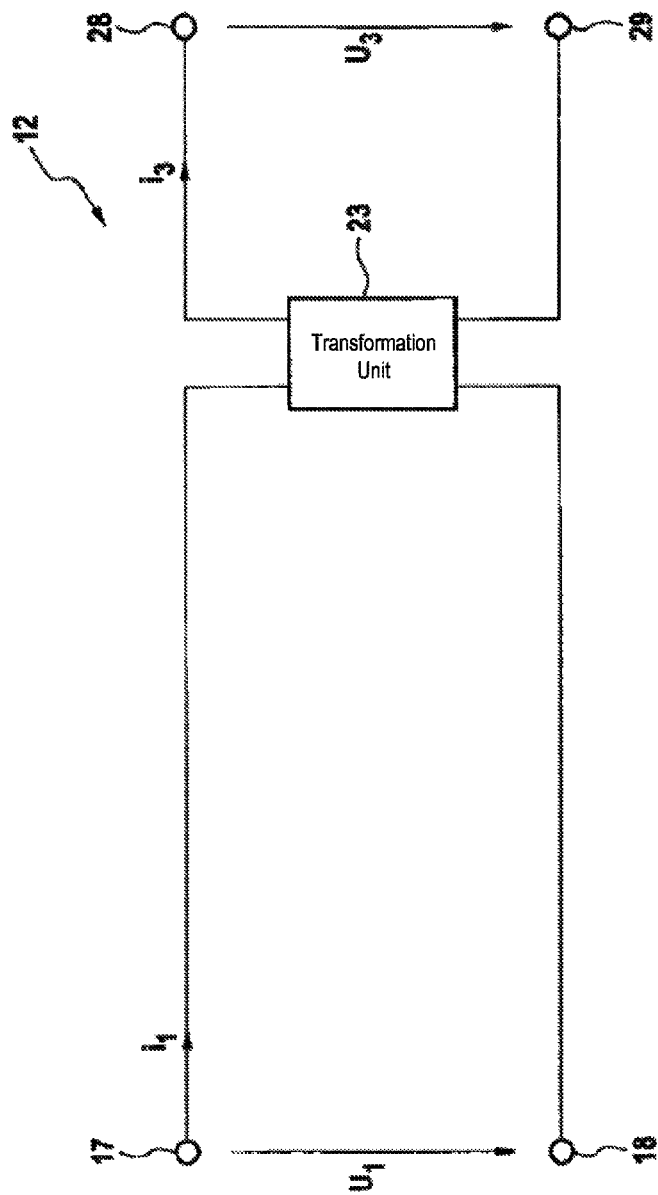
FIG. 2: shows an exemplary embodiment of a direct voltage converter according to the invention.

An exemplary embodiment of the direct voltage converter 12 according to the invention is shown in FIG. 2. The direct voltage converter 12 is connected by means of its connectors or terminals 17 and 18 to the high-voltage direct voltage network described, wherein a first high-voltage voltage $U_1$ which appears in the high-voltage direct voltage network appears between the connectors 17 and 18. A transformation unit 23 is used to convert the high-voltage voltage $U_1$ and the first current $i_1$ which flows in the high-voltage direct voltage network into a second voltage U3 and a second current i3 in the described second low-voltage direct voltage network on the other side of the transformation unit 23. The transformation unit can be realized, for example, by means of a transformer.

In particular, the transformation unit 23 has a constant transformation ratio. The voltage $U_3$ therefore appears in the low-voltage direct voltage network.

Figure 3:
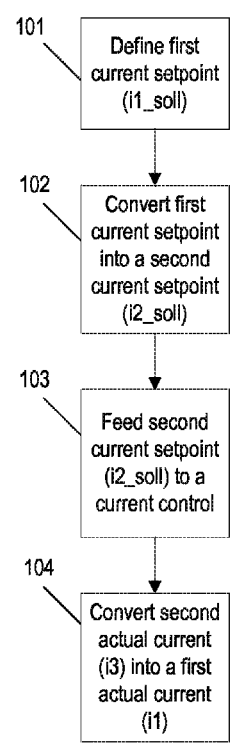
FIG. 3: shows a schematic flow diagram of the method according to the invention.

A schematic flow diagram of the method according to the invention is shown in FIG. 3. A first current setpoint (i1_soll) for the current-control-free high-voltage direct voltage network is defined in block 101 and is converted in block 102 into a second current setpoint (i2_soll) of the low-voltage direct voltage network in accordance with the transfer function $G_{S(S)}$ of the transformation unit 23.

In block 103, this second current setpoint (i2_soll) is fed to a current control of the low-voltage direct voltage network, with which the second actual current $i_3$ flowing in the low-voltage direct voltage network is controlled. This controlled second actual current $i_3$ of the low-voltage direct voltage network is converted by means of the transformation unit 23, which has a constant transformation ratio, into a first actual current $i_1$ of the high-voltage direct voltage network (block 104). As the first actual current $i_1$ of the high-voltage direct voltage network behaves substantially proportionally to the second actual current $i_3$ within the low-voltage direct voltage network due to the constant transformation ratio, the first actual current $i_1$ of the high-voltage direct voltage network is controlled to the level of the first current setpoint (i1_soll) of the high-voltage direct voltage network.

Figure 4:
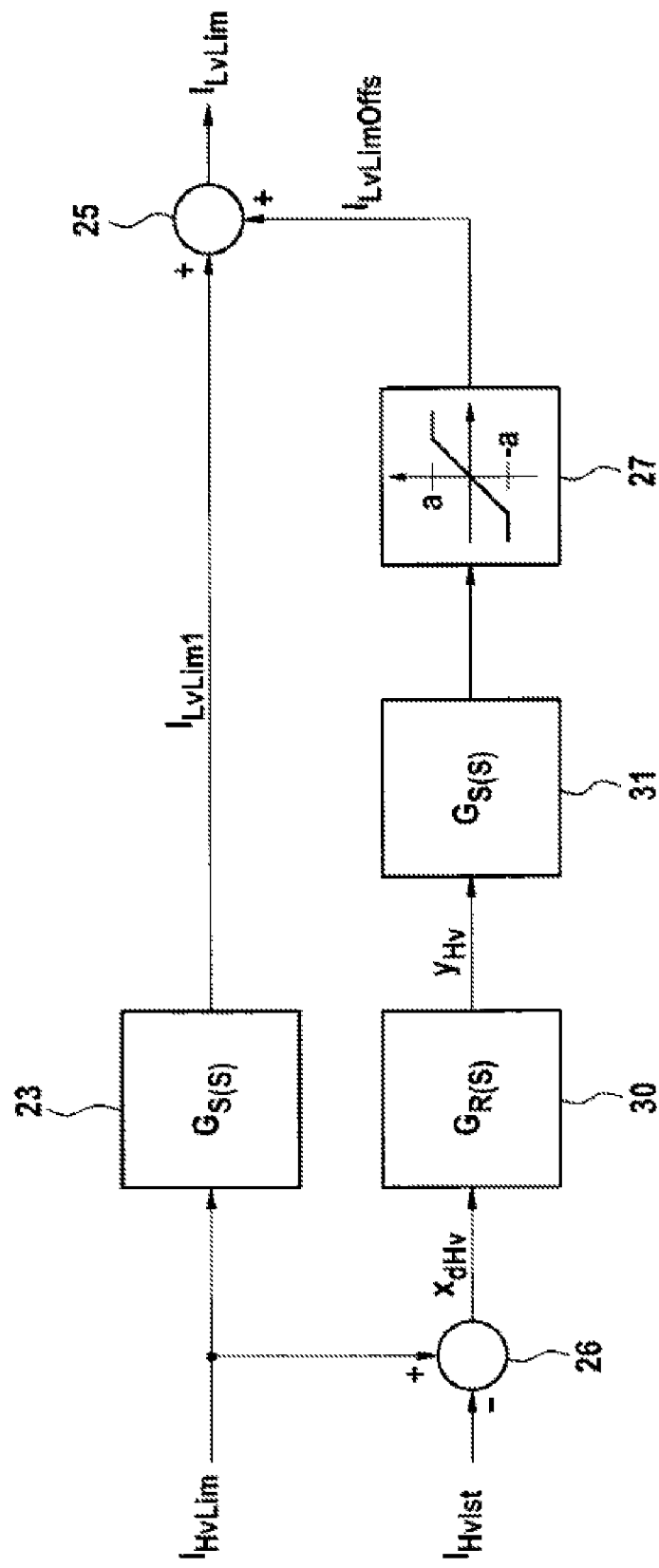
FIG. 4: shows a schematic diagram for correcting the second current setpoint of the second direct voltage network on which the current control acts.

A schematic diagram for correcting the second current setpoint of the second direct voltage network on which the current control acts is shown in FIG. 4. Here, a specified current setpoint $I_{HvLim}$ of the high-voltage direct voltage network is converted by means of the transfer function $G_{S(S)}$, which corresponds to the ratio of the transformation unit 23, into a current setpoint $I_{LvLim1}$ in the low-voltage direct voltage network.

As the efficiency of the direct voltage converter 12 varies due to saturation effects and temperature dependencies of its electrical components, an offset current value $k_{LvLimOffs}$ is added at point 25 to the current limit $I_{LvLim1}$ of the low-voltage direct voltage network. This offset current value $I_{LvLimOffs}$ is formed from a difference of the specified current limit $I_{Hvlim}$ on the high-voltage direct voltage network side and the actual current $I_{HvIst}$ which currently appears on the high-voltage direct voltage network side. This difference $x_{dHv}$ is fed to a parallel second control path which has the transfer functions $G_{R(S)}$ and $G_{S(S)}$ (blocks 30 and 31). In the process, the control output $y_{Hv}$ of the control $G_{R(S)}$ (block 30) provides a value of an offset current value referred to the first direct voltage network, with which the hardware tolerances of the hardware unit 16 are eliminated.

Before the offset current value $I_{LvLimOffs}$ is fed to the point 25 and there added to the current limit $I_{LvLim1}$ of the low-voltage direct voltage network, the value $y_{Hv}$ in block 30 which is present at the output of block 30 is transformed by means of the transfer function $G_{S(S)}$ (block 31) and fed to a limiter in block 27. This limiter has the task of ensuring that the control of the offset current value $I_{LvLimOffs}$ only limits the small tolerances of the hardware unit 16 of the low-voltage direct voltage network current control which are to be expected. Increasing the dynamics of the direct voltage converter 12 for rapid changes ensures that implausible values of the offset current value $I_{LvLimOffs}$ cannot be calculated. The limiter 27 therefore prevents overshoots.

The current limit $I_{LvLim}$, which is fed to the current control in the low-voltage direct voltage network and which results from the addition of the current limit $I_{LvLim1}$ and the offset current value $I_{LvLimOffs}$ at point 25, is determined from the current limit $I_{HvLim}$ which is specified for the high-voltage direct voltage network. The current limit $I_{HvLim}$ which appears in the high-voltage direct voltage network and which corresponds to the first current setpoint of the high-voltage direct voltage network is converted into the required second current setpoint $I_{LvLim}$ which is fed to the current control of the low-voltage direct voltage network. The hardware unit 16 can now directly control the current i3 to the level of this second current setpoint $I_{Lvlim}$. If the behavior of the direct voltage converter 1 is considered at its connectors 17, 18 to the high-voltage direct voltage network and 28, 29 to the low-voltage direct voltage network, then this gives the impression that the current it in the high-voltage direct voltage network is controlled to the level of the specified current setpoint $I_{Hvlim}$.

The case where the low-voltage direct voltage network has a current control has been considered in the exemplary embodiment. However, the invention is also applicable to the case where the high-voltage direct voltage network has a current control for the current it with the first current setpoint (I_1Soll). If the first current setpoint (I_1_Soll) is now calculated from the second current setpoint (I_3_Soll), in this case the current i3 of the low-voltage direct voltage network can be controlled.

The invention claimed is:

1. A method for controlling a first current in a first direct voltage network which is connected to a direct voltage converter, the method comprising:
   transmitting energy between the first and a second direct voltage network by means of a transformation unit of the direct voltage converter,
   providing a current control for the control of a second current in the second direct voltage network,
   determining a second current setpoint from a first current setpoint of the first direct voltage network based on a transfer function of the transformation unit, which second current setpoint is fed to the current control and therefore the first current of the first direct voltage network is controlled.

2. The method according to claim 1, wherein a second current setpoint limit of the second direct voltage network is determined from a first current setpoint limit of the first direct voltage network which is corrected by an offset current value.

3. The method according to claim 2, wherein the offset current value is formed from a difference between the first current setpoint limit and an actual current of the first direct voltage network, wherein this difference is fed, in particular, to a further control.

4. The method according to claim 3, wherein this difference is limited in the further control.

5. A direct voltage converter having a transformation unit which connects a first direct voltage network to a second direct voltage network, wherein energy is transmitted between the first and the second direct voltage network via the transformation unit of the direct voltage converter and wherein a current control for the control of a second current is provided in the second direct voltage network, wherein a hardware unit is configured to determine a second current setpoint from a first current setpoint of the first direct voltage network based on a transfer function of the transformation unit, which second current setpoint is fed to the current control and a first actual current of the first direct voltage network is controlled.

6. The direct voltage converter according to claim 5, wherein the transformation unit comprises a transformer.

* * * * *